(12) United States Patent
Brocker et al.

(10) Patent No.: US 9,135,129 B2
(45) Date of Patent: Sep. 15, 2015

(54) METHOD AND APPARATUS FOR TESTING A RANDOM NUMBER GENERATOR TESTER

(71) Applicants: Matthew W. Brocker, Gilbert, AZ (US); Steven E. Cornelius, Gilbert, AZ (US); Thomas E. Tkacik, Phoenix, AZ (US)

(72) Inventors: Matthew W. Brocker, Gilbert, AZ (US); Steven E. Cornelius, Gilbert, AZ (US); Thomas E. Tkacik, Phoenix, AZ (US)

(73) Assignee: Freescale Semiconductor, Inc., Austin, TX (US)

(*) Notice: Subject to any disclaimer, the term of this patent is extended or adjusted under 35 U.S.C. 154(b) by 293 days.

(21) Appl. No.: 13/739,732

(22) Filed: Jan. 11, 2013

(65) Prior Publication Data
US 2014/0201252 A1 Jul. 17, 2014

(51) Int. Cl.
*G06F 7/58* (2006.01)
*G06F 11/22* (2006.01)

(52) U.S. Cl.
CPC .............. *G06F 11/2205* (2013.01); *G06F 7/58* (2013.01)

(58) Field of Classification Search
None
See application file for complete search history.

(56) References Cited

U.S. PATENT DOCUMENTS 7,788,479 B2 8/2010 Ishii
2010/0057820 A1* 3/2010 Matsumoto et al. .......... 708/250

* cited by examiner

Primary Examiner — Michael D Yaary

(57) ABSTRACT

A method and apparatus for testing operation of a random number generator (RNG) testing circuit are provided. In accordance with at least one embodiment, a first RNG output value obtained from a RNG is stored in a first register. In response to activation of a test mode to simulate a faulty RNG, the first RNG output value is stored in a second register. The first RNG output value in the first register is compared to the first RNG output value in the second register. In response to the comparing, a RNG failure signal is provided at a RNG testing circuit output of the RNG testing circuit. In accordance with at least one embodiment, sequential and combinational logic can simulate a faulty RNG. Accordingly, simulation of a faulty RNG may be performed to test a RNG testing circuit even when the RNG is not faulty.

20 Claims, 8 Drawing Sheets

METHOD AND APPARATUS FOR TESTING A RANDOM NUMBER GENERATOR TESTER

BACKGROUND

1. Field of the Disclosure

This disclosure relates generally to random number generation and, more specifically, to testing of random number generators (RNGs).

2. Description of the Related Art

Random number generators (RNGs) provide data (e.g., numbers) exhibiting randomness. RNGs may be nondeterministic, in which case subsequent random data does not depend on prior random data, or deterministic, in which case subsequent random data is determined by prior random data, but the relationship between the prior random data and the subsequent random data is sufficiently obscure for the random data to exhibit sufficient randomness for its intended application. The randomness of random data generated by a RNG makes it very difficult to determine if a RNG is working properly. Thus, for many applications, a RNG can be assumed to be working properly unless it can be determined not to be working properly. One way in which a RNG might not work properly is if the RNG becomes "stuck" and outputs the same data repeatedly. To check for such a condition, a first set of random data output by a RNG may be saved and compared to a second set of random data output by the RNG, and the comparison between the first set of random data and the second set of random data may indicate whether the first set of random data and the second set of random data are identical, in which case the improper operation of RNG may be signalled by asserting a RNG failure signal.

Since RNGs are generally quite reliable and the incidence of a "stuck" RNG is generally rare, it is problematic to test whether a circuit for testing for a "stuck" RNG will actually assert a RNG failure signal in the unlikely event of a "stuck" RNG. Uncertainty with respect to a circuit for testing for a "stuck" RNG can thus lead to uncertainty with respect to the reliability of the RNG being tested.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF THE DRAWINGS

Figure 1:
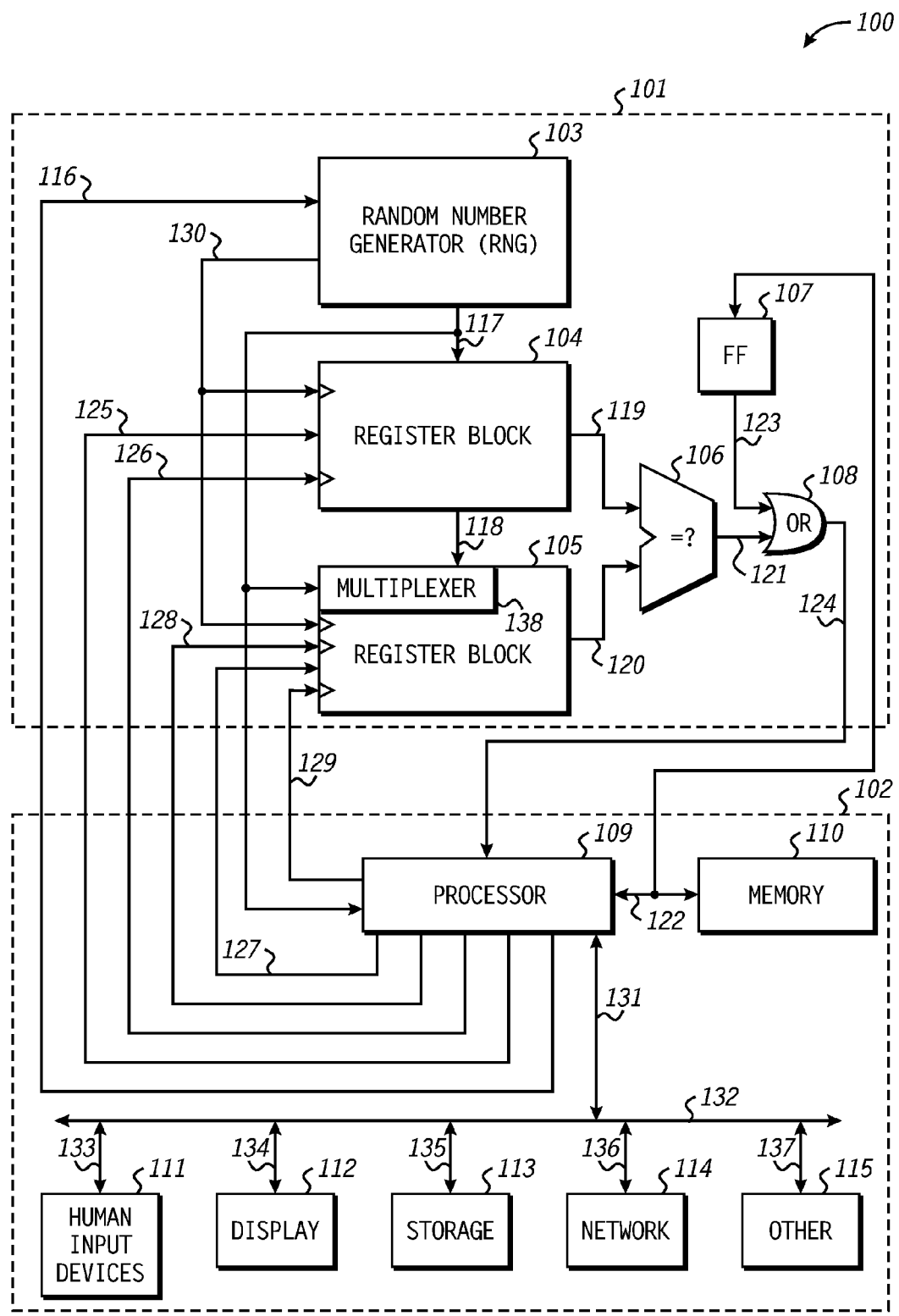
FIG. 1 is a block diagram illustrating a system comprising a RNG subsystem in accordance with at least one embodiment.

A method and apparatus for testing operation of a random number generator (RNG) testing circuit are provided. In accordance with at least one embodiment, a first RNG output value obtained from a RNG is stored in a first register. In response to activation of a test mode to simulate a faulty RNG, the first RNG output value is stored in a second register. The first RNG output value in the first register is compared to the first RNG output value in the second register. In response to the comparing, a RNG failure signal is provided at a RNG testing circuit output of the RNG testing circuit. In accordance with at least one embodiment, sequential and combinational logic can simulate a faulty RNG. Accordingly, simulation of a faulty RNG may be performed to test a RNG testing circuit even when the RNG is not faulty.

A RNG is used to obtain values of sufficient randomness for the applications obtaining the values from the RNG. Such applications may include, for example, cryptographic applications for providing privacy, authentication, integrity verification, and the like. However, for a RNG to be useful for such purposes, it must be working properly. Fully analyzing the randomness of the output of a RNG is difficult, but one simple test that can show the RNG is producing different values each time it is called upon to provide a value is to compare the previously provided value with the currently provided value and determine whether or not they are the same value. If they are not the same value, the RNG can be presumed to be working properly. Such a test may be referred to as a continuous random number check. Implementing such a check in hardware can make its function immutable and, therefore, make it tamper resistant. Thus, a hardware-based continuous random number check is useful for testing the operation of a RNG.

However, the ability to test the operation of a RNG could create a false sense of security if the testing circuit were not reliable. Since a RNG is typically designed to be very reliable, the likelihood of ever observing an indication of a faulty RNG from a RNG testing circuit is very low. Two consecutive random numbers that are equal should never be generated back to back, which therefore makes it very difficult to test for a faulty RNG in absence of an actual faulty RNG. Without being able to observe such an indication, it is not possible to show that the RNG testing circuit is able to detect a faulty RNG, nor is it possible to show that a method or apparatus for responding to a faulty RNG, such as a software routine for managing a response to a faulty RNG, would function properly. Thus, a method and apparatus for validating RNG testing and response functionality are provided. As an example, such a method and apparatus may comprise a method and apparatus for testing a circuit for testing a RNG. As another example, such a method and apparatus may comprise a method and apparatus for testing a response of software to be executed in response to the detection of a faulty RNG. Such a method and apparatus may provide verification that a failure is correctly handled by software.

FIG. 1 is a block diagram illustrating a system 100 comprising a RNG subsystem 101 in accordance with at least one embodiment. System 100 also comprises processing subsystem 102 connected to RNG subsystem 101. RNG subsystem 101 comprises RNG 103, register block 104, register block 105, and comparator 106. Register block 105 may comprise multiplexer 138. RNG subsystem 101 may also comprise combinational logic gate 108 and sequential logic gate 107. As an example, combinational logic gate 108 may be an OR gate. As an example, sequential logic gate 107 may be a D flip-flop. Processor subsystem 102 comprises a processor 109 and memory 110. Processor subsystem 102 may also comprise any or all of a bus 132, human input devices 111, display 112, storage 113, network interface 114, and other peripherals 115.

Processor 109 is connected to RNG 103 by connection 116, by which processor 109 may request RNG 103 to generate a random number. An output of RNG 103 is connected to processor 109, to an input of register block 104, and may be selectively connected to an input of register block 105 by connection 117, at which RNG 103 may output a random number it generates. Thus, the random number may be provided not only to processor 109, which may have requested the generation of the random number, but also to register block 104, which may store a copy of the random number. In normal operation, register block 105 would not also receive a copy of the random number, but the random number may be selectively copied to register block 105 to test RNG subsystem 101 in accordance with at least one embodiment, as will be described in detail below. If the random number at connection 117 is to be selectively copied to register block 105, register block 105 may use a multiplexer 138 connected to connection 117 and to connection 118 to select whether the value to be received as an input to register block 105 is to be the value present at connection 117 (i.e., the random number generated by RNG 103) or the value present at connection 118 (i.e., a previously generated random number previously generated by RNG 103 and stored in register block 104). An output of register block 104 is connected to a first input of comparator 106 via connection 119 and to an input of register block 105 via connection 118. RNG 103 may be connected to a clock input of register block 104 and to a clock input of register block 105 via connection 130 to cause the random number at the output of RNG 103 at connection 117 to be latched into register 104 and to cause the random number stored in register block 104 (i.e., a previously generated random number) and present at the output of register block 104 at connection 118 to be latched into register block 105 when RNG 103 asserts connection 130 when a random number has been generated and is being output at connection 117.

Register block 105 provides an output to a second input of comparator 106 via connection 120. Comparator 106 compares a first value received at its first input via connection 119 from register block 104 to a second value received at its second input via connection 120 from register block 105. If the first value is unequal to the second value, comparator 106 does not assert a compare failed signal at connection 121. If the first value is equal to the second value, comparator 106 asserts a compare failed signal at connection 121. The output of comparator 106 at connection 121 may be connected directly to processor 109 or, as shown, the output of comparator 106 at connection 121 may be connected to an input of a combinational logic gate 108 (e.g., an OR gate). An output of a sequential logic gate 107 (e.g., a D flip-flop) may be connected to another input of combinational logic gate 108 via connection 123. Combinational logic gate 108 asserts a compare failed signal at its output, which is connected via connection 124 to an input of processor 109, if comparator 106 determines the values provided by register block 104 and register block 105 to be equal or if the value provided to combination logic gate 108 by sequential logic gate 107 indicates that combination logic gate 108 should assert the compare failed signal, which may, for example, be done for testing purposes. Processor 109 is connected to sequential logic gate 107. As an example, processor 109 may be connected to memory 110 and to sequential logic gate 107 via memory bus 122. As an example, sequential logic gate 107 may be mapped into memory address space into which memory 110 is not mapped, which may allow processor 109 to selectively access sequential logic gate 107, for example, by writing via memory bus 122 a value to a memory address mapped to sequential logic gate 107.

An output of processor 109 may be connected to an input of register 104 via connection 125 to allow processor 109 to provide a value to be stored in register block 104 and via connection 126 to a clock input of register 104 to allow processor 109 to cause a value provided via connection 125 to be latched into register 104. Such an arrangement allows processor 109 to selectively load any desired value into register 104. For example, if processor 109 stored the previously generated random number stored in register block 105 in memory 110 when such previously generated random number was provided to processor 109 via connection 117, processor 109 may copy such previously generated random number from memory 110 to register 104, replacing the current random number stored in register 104, so that the previously generated random number copied to register 104 will be equal to the previously generated random number stored in register 105, causing comparator 106 to detect the equality and to assert the compare failed output at connection 121, allowing register block 104, register block 105, comparator 106, and all hardware and software downstream from comparator 106 for processing the compare failed signal to be tested. An output of processor 109 may be connected to an input of register 105 via connection 127 to allow processor 109 to provide a value to be stored in register block 105 and via connection 128 to a clock input of register block 105 to allow processor 109 to cause a value provided via connection 127 to be latched into register block 105. Such an arrangement allows processor 109 to selectively load any desired value into register block 105. For example, processor 109 may copy the random number being stored in register block 104 into register block 105, as such random number is provided to processor 109 via connection 117. Processor 109 may replace the previously generated random number stored in register 105 with the random number stored in register block 104, so that the random number copied to register 105 will be equal to the random number stored in register 104, causing comparator 106 to detect the equality and to assert the compare failed output at connection 121, allowing register block 104, register block 105, comparator 106, and all hardware and software downstream from comparator 106 for processing the compare failed signal to be tested.

An output of processor 109 may be connected via connection 129 to a clock input of register block 105, allowing processor 109 to cause the value at the output of register block 104 at connection 118 to be latched into register block 105, making the value in register block 105 equal to the value in register block 104, causing comparator 106 to detect the equality and to assert the compare failed output at connection 121, allowing register block 104, register block 105, comparator 106, and all hardware and software downstream from comparator 106 for processing the compare failed signal to be tested.

Processor 109 may be connected to bus 132 via bus connection 131. Peripherals may be connected to bus 132. For example, human input devices 111 may be connected to bus 132 via bus connection 133, display 112 may be connected to bus 132 via bus connection 134, storage 113 may be connected to bus 132 via bus connection 135, network interface 114 may be connected to bus 132 via bus connection 136, and other peripherals 115 may be connected to bus 132 via bus connection 137. In accordance with at least one embodiment, such peripherals may be connected to processor 109 directly without going through bus 132, bus 132 may be combined with memory bus 122 into a single bus, bus 132 may be implemented as several separate buses, or RNG subsystem 101 may be connected to processor 109 via bus 132.

Figure 2:
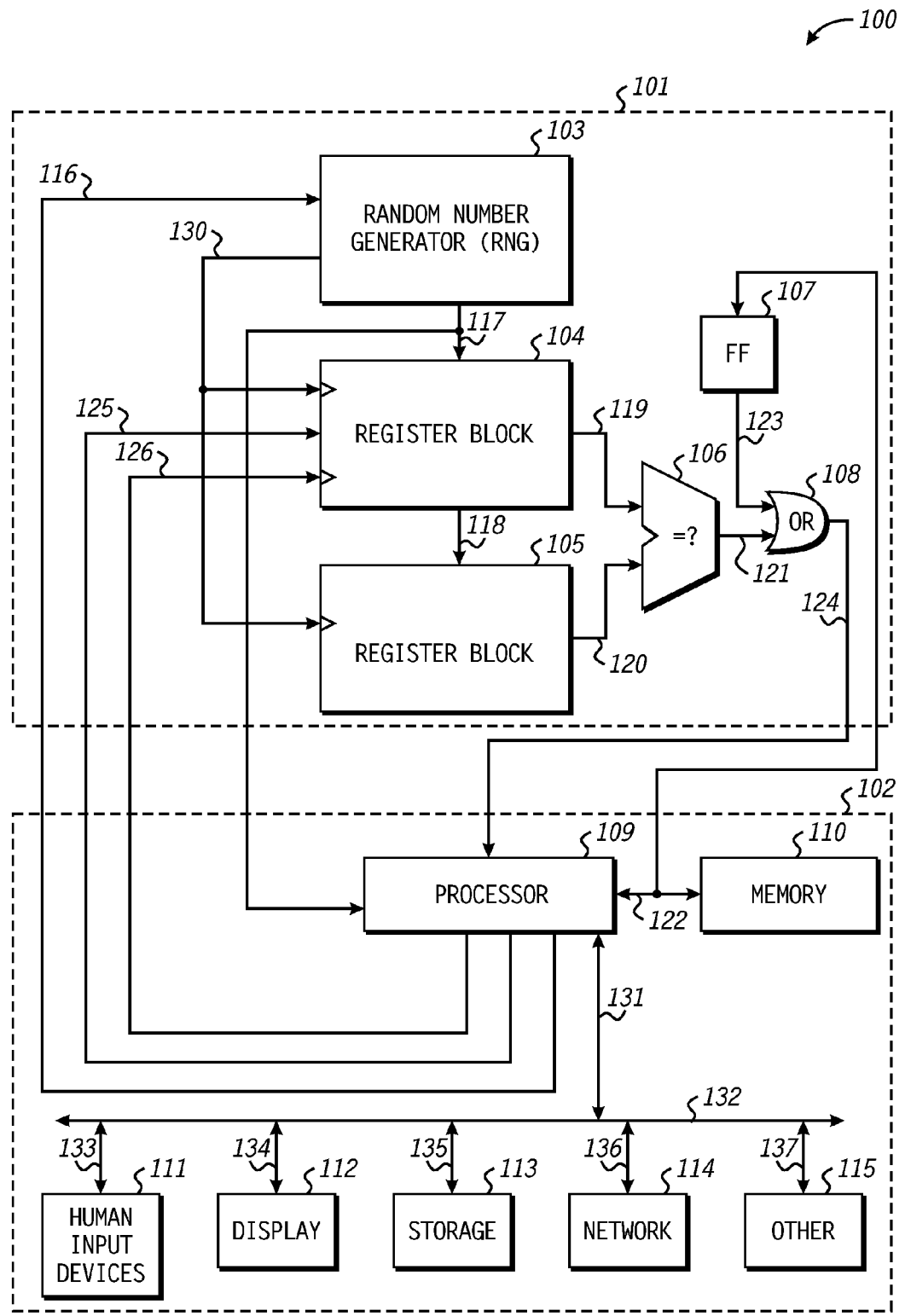
FIG. 2 is a block diagram illustrating apparatus for testing a RNG tester by selectively writing a value to a first block in accordance with at least one embodiment.

FIG. 2 is a block diagram illustrating apparatus for testing a RNG tester by selectively writing a value to a first block in accordance with at least one embodiment. The embodiment of FIG. 2 provides connections 125 and 126 from processor 109 to register block 104 to allow processor 109 to load any desired value in register block 104, which may, for example, be a value equal to the value stored in register block 105, so as to test comparator 106 and subsequent hardware and software intended to operate in response to assertion of the output of comparator 106. In contrast with an embodiment described in conjunction with FIG. 1, an ability for processor 109 to load an arbitrary value into register block 105, to selectively cause register block 105 to store a random number as that random number is being stored in register block 104, and to cause register block 105 to latch the value present at the output of register block 104 need not be present in such an embodiment.

Figure 3:
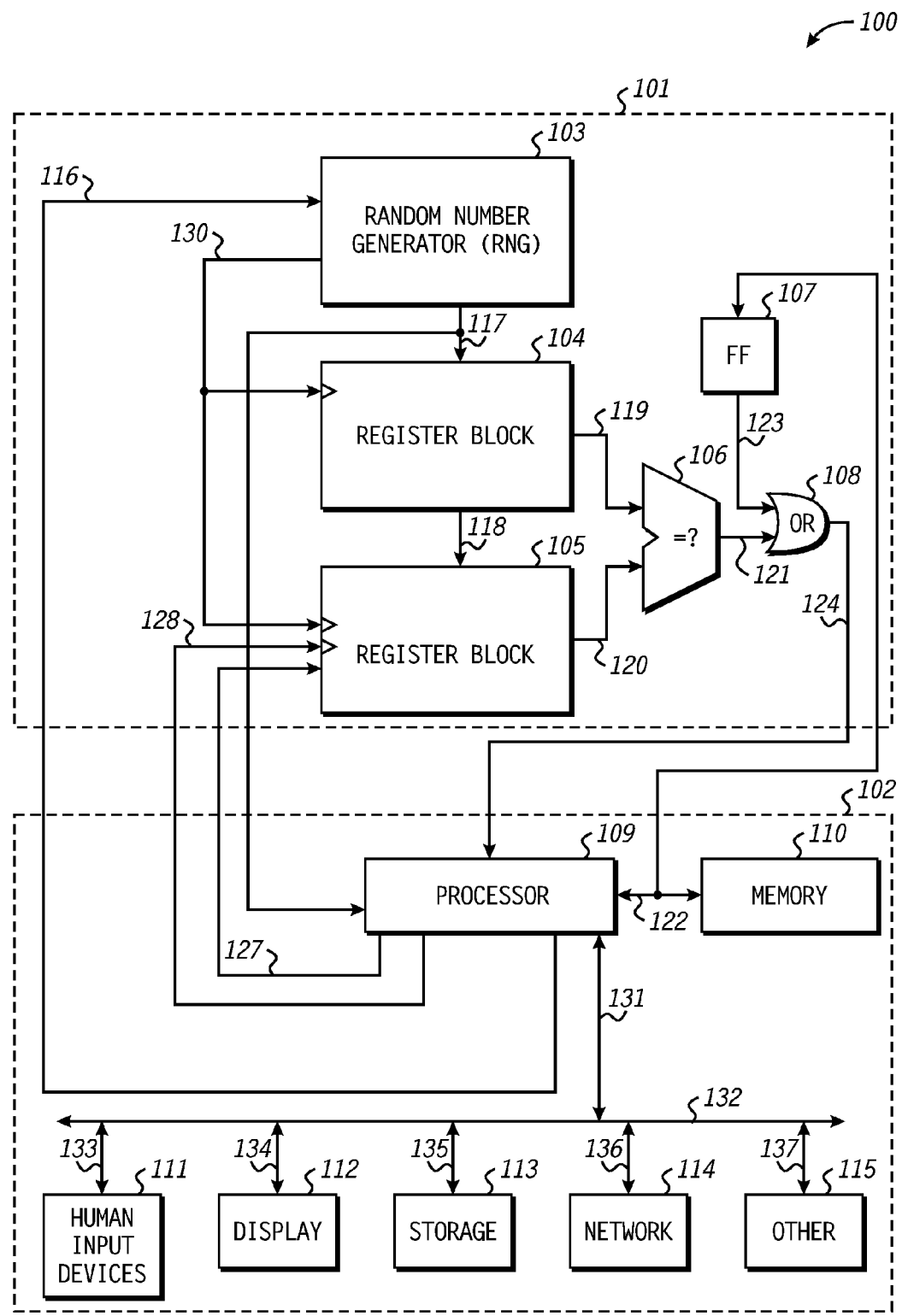
FIG. 3 is a block diagram illustrating apparatus for testing a RNG tester by selectively writing a value to a second block in accordance with at least one embodiment.

FIG. 3 is a block diagram illustrating apparatus for testing a RNG tester by selectively writing a value to a second block in accordance with at least one embodiment. The embodiment of FIG. 3 provides connections 127 and 128 from processor 109 to register block 105 to allow processor 109 to load any desired value in register block 105, which may, for example, be a value equal to the value stored in register block 104, so as to test comparator 106 and subsequent hardware and software intended to operate in response to assertion of the output of comparator 106. In contrast with an embodiment described in conjunction with FIG. 1, an ability for processor 109 to load an arbitrary value into register block 104, to selectively cause register block 105 to store a random number as that random number is being stored in register block 104, and to cause register block 105 to latch the value present at the output of register block 104 need not be present in such an embodiment.

Figure 4:
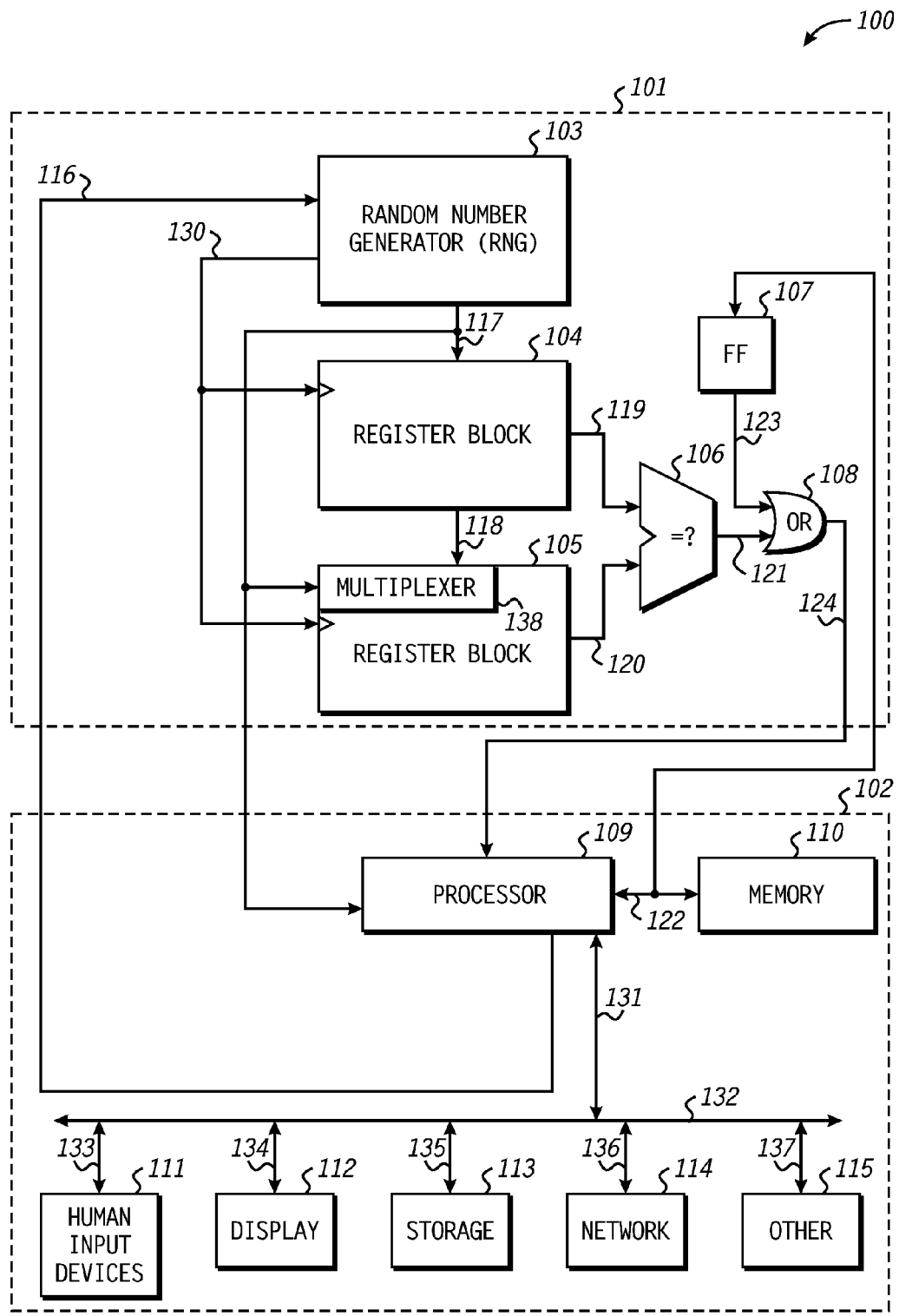
FIG. 4 is a block diagram illustrating apparatus for testing a RNG tester by selectively causing a value being written to a first block to also be written to a second block in accordance with at least one embodiment.

FIG. 4 is a block diagram illustrating apparatus for testing a RNG tester by selectively causing a value being written to a first block to also be written to a second block in accordance with at least one embodiment. The embodiment of FIG. 4 provides a selective connection via connection 117 from the output of RNG 103 to an input of register block 105 to allow the value being stored in register block 104 to also be stored in register block 105, so as to test comparator 106 and subsequent hardware and software intended to operate in response to assertion of the output of comparator 106. In contrast with an embodiment described in conjunction with FIG. 1, an ability for processor 109 to load an arbitrary value into register block 104, to load an arbitrary value into register block 105, and to cause register block 105 to latch the value present at the output of register block 104 need not be present in such an embodiment.

Figure 5:
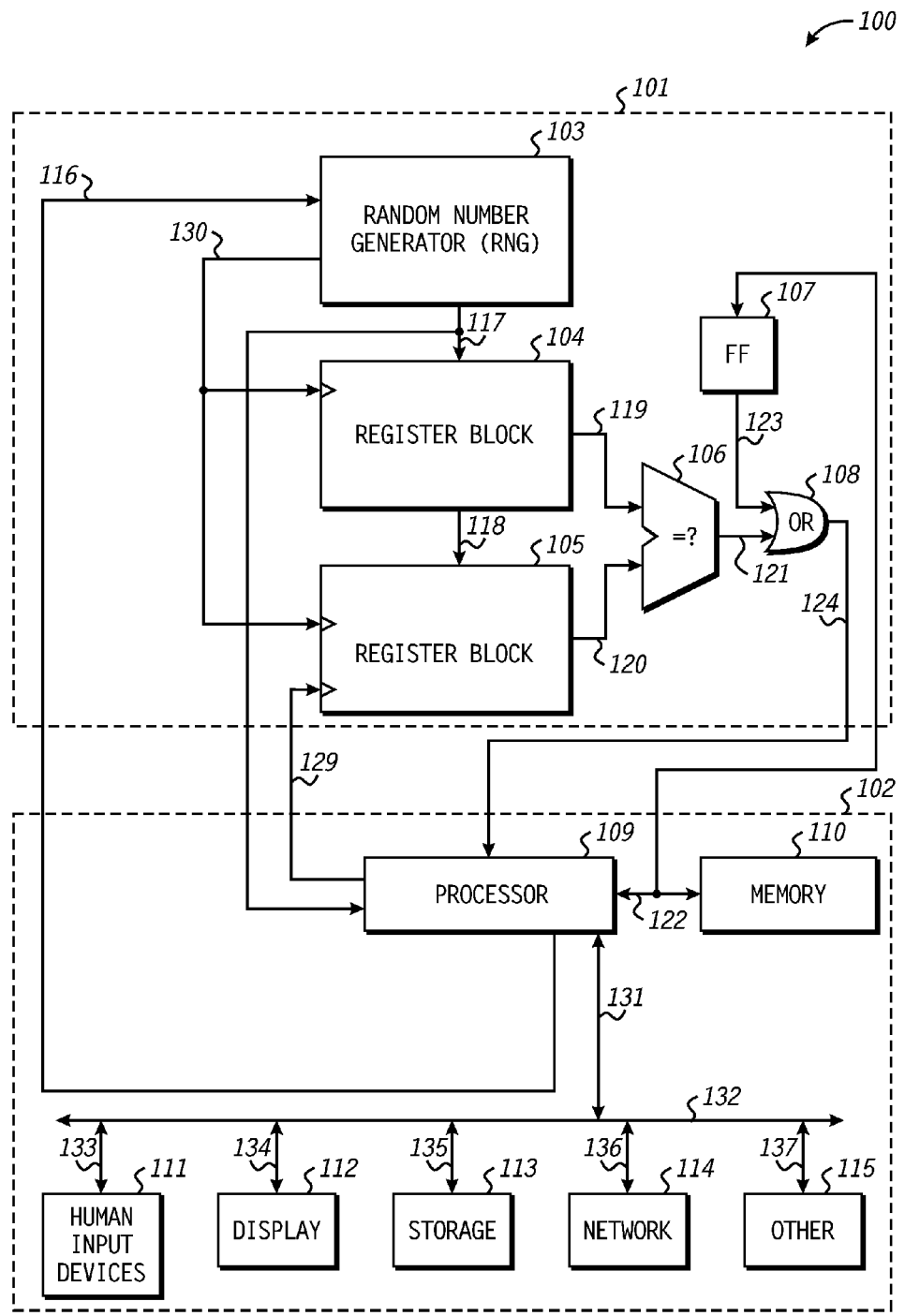
FIG. 5 is a block diagram illustrating apparatus for testing a RNG tester by selectively causing a value stored in a first block to be copied to a second block in accordance with at least one embodiment.

FIG. 5 is a block diagram illustrating apparatus for testing a RNG tester by selectively causing a value stored in a first block to be copied to a second block in accordance with at least one embodiment. The embodiment of FIG. 5 provides connection 129 from processor 109 to register block 105 to allow processor 109 to cause register block 105 to latch the value present at the output of register block 104, which is the value currently stored in register block 104, so as to test comparator 106 and subsequent hardware and software intended to operate in response to assertion of the output of comparator 106. In contrast with an embodiment described in conjunction with FIG. 1, an ability for processor 109 to load an arbitrary value into register block 104, to load an arbitrary value into register block 105, and to selectively cause register block 105 to store a random number as that random number is being stored in register block 104 need not be present in such an embodiment.

Figure 6:
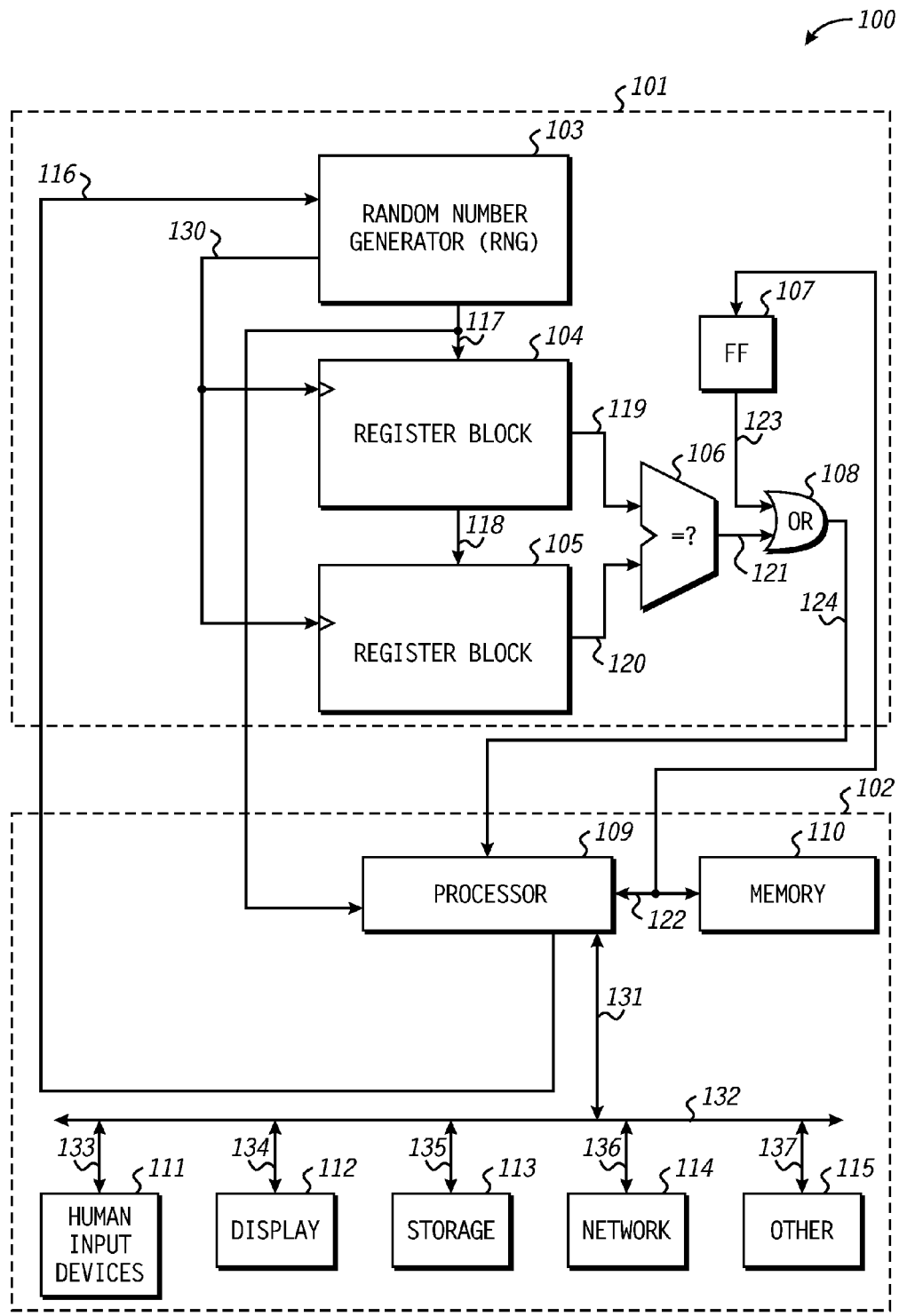
FIG. 6 is a block diagram illustrating apparatus for simulating a RNG fault indication of a RNG tester in accordance with at least one embodiment.

FIG. 6 is a block diagram illustrating apparatus for simulating a RNG fault indication of a RNG tester in accordance with at least one embodiment. The embodiment of FIG. 6 comprises combinational logic gate 108 and sequential logic gate 107. Since the state of sequential logic gate 107 may be determined by execution of software executed by processor 109, where, for example, the software may write a value to a memory location to change the state of sequential logic gate 107, sequential logic gate 107 is said to be software-writable. The state of sequential logic gate 107 can, via connection 123, affect the state of the output of combination logic gate 108 at connection 124. For example, while comparator 106 can cause a compare failed signal to be asserted at connection 124, changing the state of sequential logic gate 107 can also cause the same compare failed signal to be asserted at connection 124 even in absence of a condition at comparator 106 that would otherwise cause the compare failed signal to be asserted at connection 124. Thus, combinational logic gate 108 and sequential logic gate 107 can force the compare failed signal to be asserted to simulate an error in the RNG subsystem and allow elements, such as software being executed on a processor, intended to respond to the compare failed signal to be tested. In contrast with an embodiment described in conjunction with FIG. 1, an ability for processor 109 to load an arbitrary value into register block 104, to load an arbitrary value into register block 105, to selectively cause register block 105 to store a random number as that random number is being stored in register block 104, and to cause register block 105 to latch the value present at the output of register block 104 need not be present in such an embodiment.

While the sequential logic gate 107 is shown as providing an output to combinational logic gate 108, and combination logic gate 108 is shown as receiving inputs from sequential logic gate 107 and comparator 106, other configurations may be practiced. As an example, an output of combinational logic gate 108 may be connected to an input of sequential logic gate 107 such that the output of combinational logic gate 108 is latched into sequential logic gate 107 when the inputs of combinational logic gate 108 validly represent a comparison of the values stored in register blocks 104 and 105 and a state provided by a signal from processor 109. Thus, if processor 109 provides a signal to cause combinational logic gate 108 to assert a compare failed signal at the output of combinational logic gate 108, such a compare failed signal may be latched into sequential logic gate 107 to preserve that state. If comparator 106 detects that the contents of register blocks 104 and 105 are equal and asserts a compare failed signal at the output of comparator 106, combinational logic gate 108 may assert the compare failed signal at the output of combinational logic gate 108, and such a compare failed signal may be latched into sequential logic gate 107 to preserve that state.

In accordance with at least one embodiment, the signal communicated via connection 124 may be further conditioned. As an example, the output of logic gate 108 may provide a signal to another one or more other logic gates to control the manner in which the signal is communicated to processor 109. As an example, the output of logic gate 108 may be connected to the input of another combinational logic gate, for example, an AND gate, and another signal, for example, the signal provided via connection 130 may be connected to another input of such combinational logic gate. Accordingly, the circuit may be configured to output a RNG failure indication signal when processor 109 issues a request, for example, via connection 116, for random data from the RNG, when such a request occurs after processor 109 has changed the state of sequential logic gate 107 to force the RNG failure indication signal to be provided. Such a coordination of RNG failure indication signal with the request for random data from the RNG can allow the forced compare failure to mimic a real compare failure not only in its occurrence but also in the timing of its occurrence. Alternatively, other signal conditioning of the signal communicated via connection 124 may be utilized.

Figure 7:
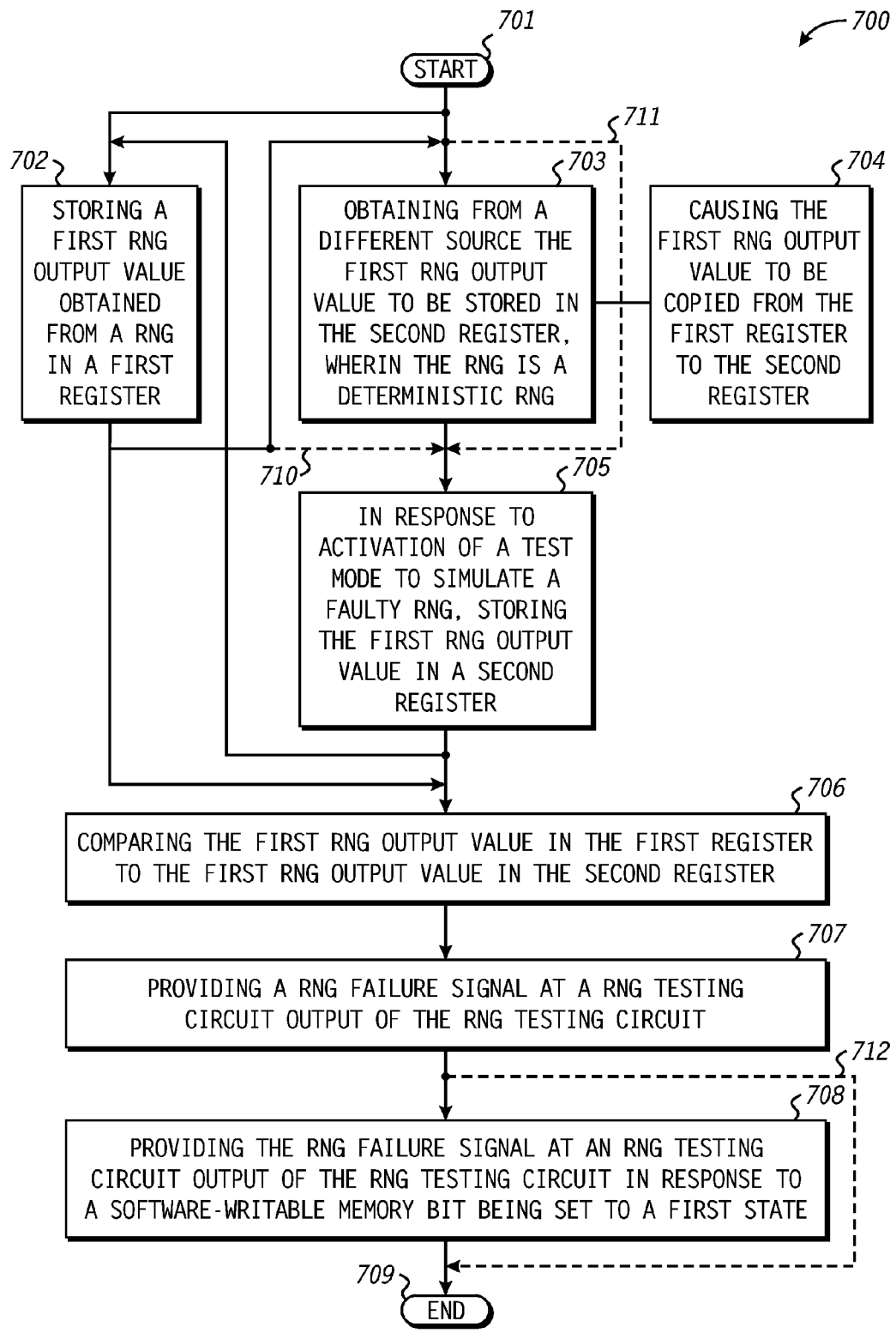
FIG. 7 is a flow diagram illustrating a method for testing a RNG tester in accordance with at least one embodiment.

FIG. 7 is a flow diagram illustrating a method 700 for testing a RNG tester in accordance with at least one embodiment. The method 700 begins in block 701. From block 701, the method 700 may continue to block 702 or to block 703 or to both simultaneously. In block 702, a first RNG output value obtained from a RNG is stored in a first register. From block 702, the method 700 continues either to block 703 (e.g., if block 703 has not already been performed) or to block 706. In block 703, the first RNG output value to be stored in the second register is obtained from a different source (i.e., a source different from the RNG, such as, for example, a processor configured to calculate the first RNG output value independently from the calculation performed by the RNG). The first register may be a register that, in normal operation, receives its value from the RNG and provides its value to the second register, or the first register may be a register that, in normal operation, receives its value from the second register. The second register may be a register that, in normal operation, receives its value from the first register, or the second register may be register that, in normal operation, receives its value from the RNG and provides its value to the first register. From block 703, the method 700 continues to block 705. In block 705, in response to activation of a test mode to simulate a faulty RNG, the first RNG output value is stored in a second register. From block 705, the method 700 continues either to block 702 (e.g., if block 702 has not already been performed) or to block 706. As denoted by dashed lines 710 and 711, in accordance with at least one embodiment, block 703 may be omitted, with the method 700 proceeding instead to block 705. As shown by block 704, block 703 may be performed by causing the first RNG output value to be copied from the first register to the second register.

In block 706, the first RNG output value in the first register is compared to the first RNG output value in the second register. From block 706, the method 700 continues to block 707. In block 707, a RNG failure signal is provided at a RNG testing circuit output of the RNG testing circuit. The RNG failure signal provided in block 707 may be dependent upon the comparison of block 706. For example, as both the first register and the second register contain the first RNG output value, the comparison of block 706 determines the first RNG output value in the first register to be equal first RNG output value in the second register, so the RNG failure signal of block 707 signals a RNG failure. From block 707, the method 700 continues via dashed line 712 and ends in block 709. In accordance with at least one embodiment, the method 700 may also comprise block 708. In block 708, the RNG failure signal is provided at the RNG testing circuit output of the RNG testing circuit in response to a software-writable memory bit being set to a first state. As an example, the method 700 may continue from block 707 to block 708 and from block 708 to block 709. In accordance with at least one embodiment, block 708 may be practiced before or after other blocks (e.g., blocks 701-707 and 709 or blocks 701, 702, 704-707, and 709) are performed and need not be performed in a temporally contiguous manner with such other blocks. For example, block 708 may be performed during a different iteration of random number generation by the RNG.

Figure 8:
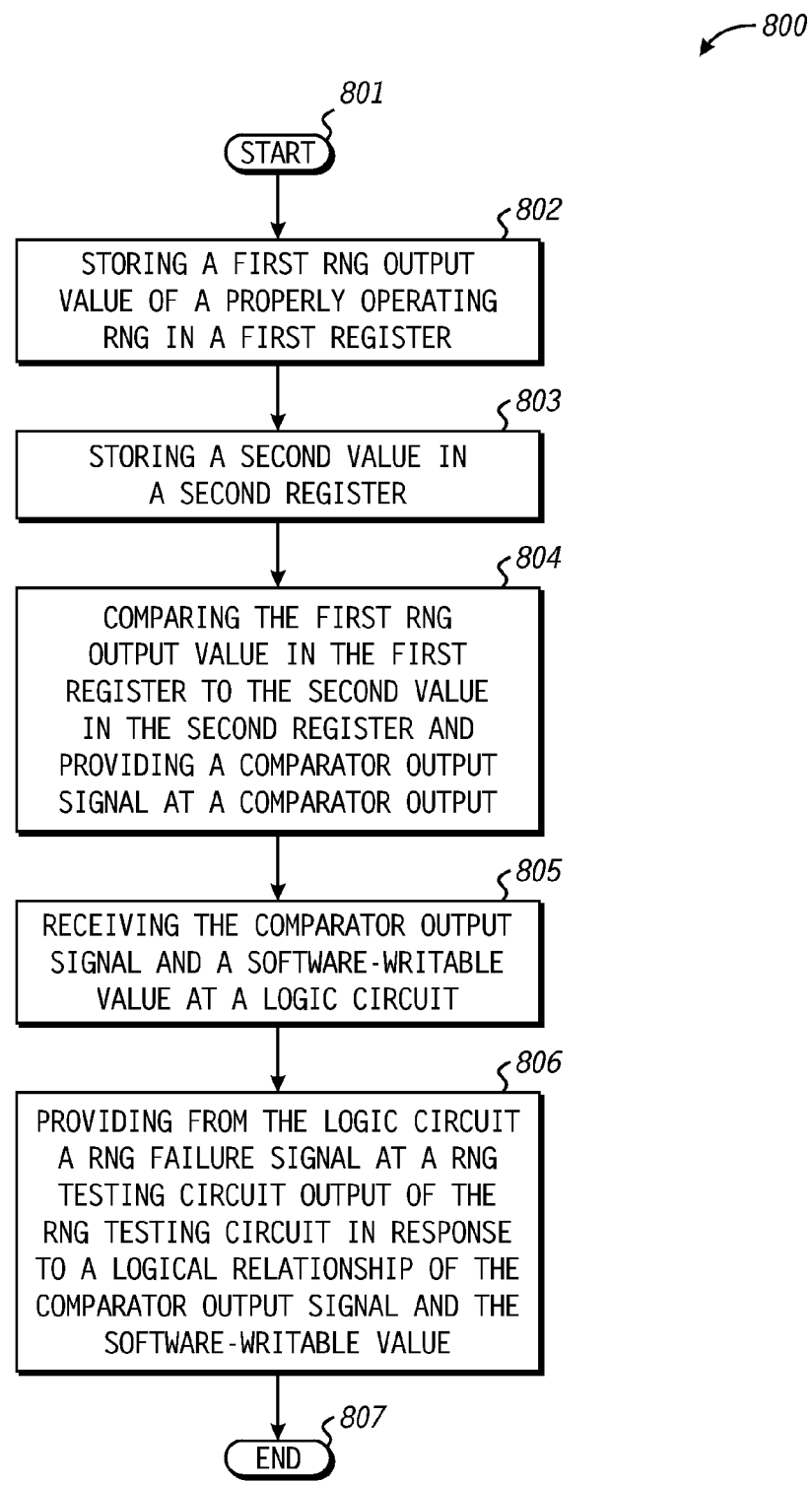
FIG. 8 is a flow diagram illustrating a method for simulating a RNG fault indication of a RNG tester in accordance with at least one embodiment.

FIG. 8 is a flow diagram illustrating a method 800 for simulating a RNG fault indication of a RNG tester in accordance with at least one embodiment. The method 800 begins in block 801. From block 801, the method 800 continues to block 802. In block 802, a first RNG output value of a properly operating RNG is stored in a first register. From block 802, the method 800 continues to block 803. In block 803, a second value is stored in a second register. Blocks 802 and 803 may occur in any order. As examples, block 802 may occur before, during, or after block 803. The second value may be any of several types of values. As examples, the second value may be a RNG output value previous to the first RNG output value, a RNG output value subsequent to the first RNG output value, or an arbitrary value. In the case where the second value is a RNG output value, the second value, as one example, may be obtained by the second register from the first register instead of being obtained by the second register from the RNG directly or, as another example, may be obtained from the RNG directly. From block 803, the method 800 continues to block 804. In block 804, the first RNG output value in the first register is compared to the second value in the second register, and a comparator output signal is provided at a comparator output. From block 804, the method 800 continues to block 805. In block 805, the comparator output signal and a software-writable value are received at a logic circuit. From block 805, the method 800 continues to block 806. In block 806, the logic circuit provides a RNG failure signal at a RNG testing circuit output of the RNG testing circuit in response to a logical relationship of the comparator output signal and the software-writable value. From block 806, the method 800 continues to block 807, where the method 800 ends.

In accordance with at least on embodiment, a method to test a continuous RNG test capability is provided. Such a method can allow software to detect the entire error path, from detection down to the software that catches and reports the condition, as a positive test. Such a positive test, which could result from a faulty RNG, can be simulated in a system with a properly operating RNG, the operation of which would not otherwise result in such a positive test.

At least one embodiment can force an error regardless of whether the two blocks of RNG data provide a comparison result showing them to be equal or not equal to each other. A comparison error can be forced, and thus a failure of a continuous RNG test can be simulated, by performing a software write to a bit in the address map of addressable memory locations. Once this bit is set, the next block of random data that is generated will automatically generate a compare error. Such a simulated error, however, does not verify that the equality operation functions as expected, which can be performed as described elsewhere herein, but does allow software to verify that the compare failed and that the RNG subsystem reports the compare failure properly back to software utilizing the RNG subsystem, such as cryptographic software.

At least one embodiment may utilize a mechanism other than mapping the error-forcing bit to a memory address, so such bit may be set and cleared by an operation other than writing a value to a memory address. As an example, the circuit comprising the sequential logic element and the combinational logic element may be connected to the processor via a communication bus (e.g., a I2C, SPI, etc. bus). In the event that such a communication bus uses addressing, the circuit may be addressed using a device address rather than a memory address. As another example, the circuit comprising the sequential logic element and the combinational logic element may be connected to the processor via another type of connection, for example, a general-purpose input/output (GPIO) line. Such a connection may be expanded, for example, by multiplexing it, or such a connection may be made on a one-to-one basis solely between the processor and the circuit comprising the sequential logic element and the combinational logic element. Alternatively, other techniques for setting and clearing a bit in the sequential logic element under the control of software executed on a processor may be used to control the operation of the circuit comprising the sequential logic element and the combinational logic element.

At least one embodiment can simulate a RNG error by allowing writing of a value to a block to be compared that represents the next random value provided by the RNG. Most random number generators have a deterministic mode that allows software to generate deterministic random data. If the software knows what the next deterministic block of random data will be, then software can write the value directly into a block to be compared. When software requests the next block to be generated, a compare error will be flagged by the random number generator. Such a procedure will verify that the equality operation is working as expected.

Apparatus may include a RNG with a continuous RNG tester and additional logic circuitry to test the operation of the continuous RNG tester. The additional logic circuitry allows an unlikely failure of the RNG to be simulated. The ability to simulate the RNG failure provides software a way of verifying that the random compare actually works in a system, which provides objective evidence that the RNG and the continuous RNG tester can be trusted to perform properly.

To test the operation of a RNG, a random number test may be performed. The random number test may be performed continuously, which refers to testing each random number generated as it is provided by the RNG. Continuous RNG testing of a RNG allows a RNG fault to be identified immediately and, with appropriate action by software utilizing the RNG, can prevent faulty RNG values from being used. If, for example, a cryptographic module employs approved or non-approved RNGs in an approved mode of operation, it may be desirable for the module to perform the following continuous random number generator test on each RNG that tests for failure to a constant value: (1) If each call to a RNG produces blocks of n bits (where n>15), the first n-bit block generated after power-up, initialization, or reset shall not be used, but shall be saved for comparison with the next n-bit block to be generated. Each subsequent generation of an n-bit block shall be compared with the previously generated block. The test shall fail if any two compared n-bit blocks are equal. (2) If each call to a RNG produces fewer than 16 bits, the first n bits generated after power-up, initialization, or reset (for some n>15) shall not be used, but shall be saved for comparison with the next n generated bits. Each subsequent generation of n bits shall be compared with the previously generated n bits. The test fails if any two compared n-bit sequences are equal. While the test may provide a way to test a RNG, at least one embodiment disclosed herein provides a way to test the implementation of the above test to provide assurance that not only the RNG, but also the RNG test, are working properly. By adding testability to logic that is otherwise not testable by software, as the RNG should never generate the same value twice in a row, improved confidence in the reliability of the RNG subsystem, as a whole, is provided. The proper operation of software for responding to a compare error of a RNG test may be verified in situ using the actual circuits of the RNG subsystem, and such verification may be performed as frequently as desired in a deployed system, for example, every time power is applied to the system, every time the RNG subsystem is initialized, every time the RNG subsystem is requested to generate a random number, periodically during system operation, and the like.

In accordance with at least one embodiment, a method for testing operation of a random number generator (RNG) testing circuit comprises, at a first time, storing a first RNG output value obtained from a RNG in a first register; at a second time, in response to activation of a test mode to simulate a faulty RNG, storing the first RNG output value in a second register; at a third time, comparing the first RNG output value in the first register to the first RNG output value in the second register; and, in response to the comparing, providing a RNG failure signal at a RNG testing circuit output of the RNG testing circuit. In accordance with at least one embodiment, the second time occurs after the first time. In accordance with at least one embodiment, the second time occurs before the first time. In accordance with at least one embodiment, the second time occurs substantially simultaneously with the first time.

In accordance with at least one embodiment, the method further comprises obtaining from a different source the first RNG output value to be stored in the second register, wherein the RNG is a deterministic RNG. In accordance with at least one embodiment, the storing the RNG output value in the second register comprises causing the first RNG output value to be copied from the first register to the second register. In accordance with at least one embodiment, the method further comprises providing the RNG failure signal at a RNG testing circuit output of the RNG testing circuit in response to a software-writable memory bit being set to a first state.

In accordance with at least one embodiment, a method comprises storing a first random number generator (RNG) output value of a properly operating RNG in a first register; storing a second value in a second register; comparing the first RNG output value in the first register to the second value in the second register and providing a comparator output signal at a comparator output; receiving the comparator output signal and a software-writable value at a logic circuit; and providing from the logic circuit a RNG failure signal at a RNG testing circuit output of the RNG testing circuit in response to a logical relationship of the comparator output signal and the software-writable value. In accordance with at least one embodiment, the logic circuit causes the RNG failure signal to have a RNG failure signal value indicative of a RNG failure when the software-writable value has a first value regardless of a comparator output value of the comparator output signal. In accordance with at least one embodiment, the logic circuit stores the software-writable value and performs a logical operation on the software-writable value and a comparator output value of the comparator output signal received from the comparator to produce the RNG failure signal.

In accordance with at least one embodiment, a random number generator (RNG) testing circuit comprises a first register for storing a RNG output value of a RNG; a second register comprising a test mode input adapted to cause the second register to store the RNG output value to simulate a faulty RNG; and a comparator coupled to the first register and to the second register for comparing the RNG output value in the first register to the RNG output value in the second register while the RNG output value is stored in the first register and the second register and for providing a RNG failure signal at a RNG testing circuit output of the RNG testing circuit. In accordance with at least one embodiment, the second register is configured to store the RNG output value after the first register has stored the RNG output value. In accordance with at least one embodiment, the second register is configured to store the RNG output value before the first register has stored the RNG output value. In accordance with at least one embodiment, the second register is configured to store the RNG output value simultaneously with the first register storing the RNG output value.

In accordance with at least one embodiment, the RNG testing circuit further comprises a processor distinct from the RNG, the processor coupled to the second register, the processor for calculating the RNG output value to be stored in the second register, wherein the RNG provides the RNG output value to be stored in the first register, wherein the RNG is a deterministic RNG. In accordance with at least one embodiment, the second register obtains the RNG output value stored in the second register from the first register. In accordance with at least one embodiment, the RNG testing circuit further comprises a memory for storing a software-writable memory bit, wherein the RNG testing circuit provides the RNG failure signal at the RNG testing circuit output in response to a software-writable memory bit being set to a first state.

In accordance with at least one embodiment, a random number generator (RNG) testing circuit comprises a first register for storing a first RNG output value of a properly operating RNG; a second register for storing a second value; a comparator coupled to the first register and to the second register for comparing the first RNG output value in the first register to the second value in the second register and for providing a comparator output signal at a comparator output of the comparator; and a logic circuit coupled to the comparator output for receiving the comparator output signal and a software-writable value and for providing a RNG failure signal at a RNG testing circuit output of the RNG testing circuit in response to a logical relationship of the comparator output signal and the software-writable value, the logic circuit comprising: a sequential logic element; and a combinational logic element coupled to the sequential logic element. In accordance with at least one embodiment, the logic circuit causes the RNG failure signal to have a RNG failure signal value indicative of a RNG failure when the software-writable value has a first value regardless of a comparator output value of the comparator output. In accordance with at least one embodiment, the sequential logic element stores the software-writable value and the combinational logic element performs a logical operation on the software-writable value received from the sequential logic element and a comparator output value of the comparator output signal received from the comparator to produce the RNG failure signal.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method for testing operation of a random number generator (RNG) testing circuit comprising:
    at a first time, storing a first RNG output value obtained from a RNG in a first register;
    at a second time, in response to activation of a test mode to simulate a faulty RNG, storing the first RNG output value in a second register;
    at a third time, comparing the first RNG output value in the first register to the first RNG output value in the second register; and
    in response to the comparing, providing a RNG failure signal at a RNG testing circuit output of the RNG testing circuit.

2. The method of claim 1 wherein the second time occurs after the first time.

3. The method of claim 1 wherein the second time occurs before the first time.

4. The method of claim 1 wherein the second time occurs substantially simultaneously with the first time.

5. The method of claim 1 further comprising:
    obtaining from a different source the first RNG output value to be stored in the second register, wherein the RNG is a deterministic RNG.

6. The method of claim 1 wherein the storing the RNG output value in the second register comprises:
    causing the first RNG output value to be copied from the first register to the second register.

7. The method of claim 1 further comprising:
    providing the RNG failure signal at a RNG testing circuit output of the RNG testing circuit in response to a software-writable memory bit being set to a first state.

8. A method comprising:
    storing a first random number generator (RNG) output value of a properly operating RNG in a first register;
    storing a second value in a second register;
    comparing the first RNG output value in the first register to the second value in the second register and providing a comparator output signal at a comparator output;
    receiving the comparator output signal and a software-writable value at a logic circuit; and
    providing from the logic circuit a RNG failure signal at a RNG testing circuit output of the RNG testing circuit in response to a logical relationship of the comparator output signal and the software-writable value.

9. The method of claim 8 wherein the logic circuit causes the RNG failure signal to have a RNG failure signal value indicative of a RNG failure when the software-writable value has a first value regardless of a comparator output value of the comparator output signal.

10. The method of claim 8 wherein the logic circuit stores the software-writable value and performs a logical operation on the software-writable value and a comparator output value of the comparator output signal received from the comparator to produce the RNG failure signal.

11. A random number generator (RNG) testing circuit comprising:
a first register for storing a RNG output value of a RNG;
a second register comprising a test mode input adapted to cause the second register to store the RNG output value to simulate a faulty RNG; and
a comparator coupled to the first register and to the second register for comparing the RNG output value in the first register to the RNG output value in the second register while the RNG output value is stored in the first register and the second register and for providing a RNG failure signal at a RNG testing circuit output of the RNG testing circuit.

12. The RNG testing circuit of claim 11 wherein the second register is configured to store the RNG output value after the first register has stored the RNG output value.

13. The RNG testing circuit of claim 11 wherein the second register is configured to store the RNG output value before the first register has stored the RNG output value.

14. The RNG testing circuit of claim 11 wherein the second register is configured to store the RNG output value simultaneously with the first register storing the RNG output value.

15. The RNG testing circuit of claim 11 further comprising:
a processor distinct from the RNG, the processor coupled to the second register, the processor for calculating the RNG output value to be stored in the second register, wherein the RNG provides the RNG output value to be stored in the first register, wherein the RNG is a deterministic RNG.

16. The RNG testing circuit of claim 11 wherein the second register obtains the RNG output value stored in the second register from the first register.

17. The RNG testing circuit of claim 11 further comprising:
a memory for storing a software-writable memory bit, wherein the RNG testing circuit provides the RNG failure signal at the RNG testing circuit output in response to a software-writable memory bit being set to a first state.

18. A random number generator (RNG) testing circuit comprising:
a first register for storing a first RNG output value of a properly operating RNG;
a second register for storing a second value;
a comparator coupled to the first register and to the second register for comparing the first RNG output value in the first register to the second value in the second register and for providing a comparator output signal at a comparator output of the comparator; and
a logic circuit coupled to the comparator output for receiving the comparator output signal and a software-writable value and for providing a RNG failure signal at a RNG testing circuit output of the RNG testing circuit in response to a logical relationship of the comparator output signal and the software-writable value, the logic circuit comprising:
a sequential logic element; and
a combinational logic element coupled to the sequential logic element.

19. The RNG testing circuit of claim 18 wherein the logic circuit causes the RNG failure signal to have a RNG failure signal value indicative of a RNG failure when the software-writable value has a first value regardless of a comparator output value of the comparator output.

20. The RNG testing circuit of claim 18 wherein the sequential logic element stores the software-writable value and the combinational logic element performs a logical operation on the software-writable value received from the sequential logic element and a comparator output value of the comparator output signal received from the comparator to produce the RNG failure signal.

* * * * *